United States Patent
Fu et al.

(10) Patent No.: US 9,218,325 B2
(45) Date of Patent: *Dec. 22, 2015

(54) QUICK FONT MATCH

(71) Applicant: International Business Machines Corporation, Armonk, NY (US)

(72) Inventors: Xing W. Fu, Beijing (CN); Yanmin Jia, Beijing (CN); Jing Lai, Beijing (CN); Hai F. Zhang, Beijing (CN); Jian F. Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,209

(22) Filed: Apr. 6, 2015

(65) Prior Publication Data

US 2015/0212983 A1   Jul. 30, 2015

Related U.S. Application Data

(63) Continuation of application No. 13/217,403, filed on Aug. 25, 2011, now Pat. No. 9,002,877.

(30) Foreign Application Priority Data

Aug. 31, 2010   (CN) .......................... 2010 1 0270921

(51) Int. Cl.
| | | |
|---|---|---|
| *G06F 17/21* | (2006.01) | |
| *G06F 17/30* | (2006.01) | |
| *G06T 11/20* | (2006.01) | |

(52) U.S. Cl.
CPC ........ *G06F 17/214* (2013.01); *G06F 17/30979* (2013.01); *G06T 11/203* (2013.01)

(58) Field of Classification Search
CPC ............ G06F 17/214; G06F 17/30979; G06T 11/203
See application file for complete search history.

(56) References Cited

U.S. PATENT DOCUMENTS

| | | | |
|---|---|---|---|
| 5,251,293 | A | 10/1993 | Ishii et al. |
| 5,410,640 | A | 4/1995 | Morikawa et al. |

(Continued)

FOREIGN PATENT DOCUMENTS

| | | |
|---|---|---|
| CN | 1536483 A | 10/2004 |
| TW | 565803 B | 12/2003 |

(Continued)

OTHER PUBLICATIONS

Non-Final Office Action for U.S. Appl. No. 13/217,403, mailed May 16, 2012, 19 pages, U.S. Patent and Trademark Office.

(Continued)

*Primary Examiner* — Jorge A Casanova
(74) *Attorney, Agent, or Firm* — Jordan IP Law, LLC

(57) ABSTRACT

Embodiments of the present invention relate to a font match technology, and in particular relate to a technology for performing font match with attribute values of a font. A method for font matching may include generating a two-dimensional link matrix based on available fonts and attribute values of the available fonts, receiving a font match query, and determining a font matching the received font match query from the available fonts by using the two-dimensional link matrix. Font matching may be implemented automatically, quickly, and accurately, without the need of manually randomly trying each font of a plurality of available fonts. Meanwhile, this method is independent from text processing software and may be called by any arbitrary text processing software (application). Moreover, this method allows the user to flexibly configure selection of the font attributes so as to perform font match more efficiently.

20 Claims, 5 Drawing Sheets

(56) References Cited

U.S. PATENT DOCUMENTS

| | | |
|---|---|---|
| 5,539,840 A | 7/1996 | Krtolica et al. |
| 5,586,242 A | 12/1996 | McQueen et al. |
| 5,689,724 A | 11/1997 | Morgan et al. |
| 5,790,093 A | 8/1998 | Takahashi |
| 6,337,924 B1 | 1/2002 | Smith |
| 6,512,531 B1 | 1/2003 | Gartland |
| 6,687,879 B1 | 2/2004 | Teshima |
| 7,107,263 B2 | 9/2006 | Yianilos et al. |
| 7,197,706 B1 | 3/2007 | Berson et al. |
| 2002/0194261 A1 | 12/2002 | Teshima |
| 2004/0119714 A1 | 6/2004 | Everett et al. |
| 2008/0150947 A1 | 6/2008 | Suzuki |
| 2008/0303822 A1 | 12/2008 | Taylor et al. |
| 2009/0284778 A1 | 11/2009 | Hodder et al. |
| 2012/0216046 A1 | 8/2012 | McDougal et al. |
| 2014/0085310 A1 | 3/2014 | Wu et al. |

FOREIGN PATENT DOCUMENTS

| | | |
|---|---|---|
| TW | I230533 B | 4/2005 |
| TW | 200522650 A | 7/2005 |
| TW | 200905516 A | 2/2009 |
| TW | 201030557 A | 8/2010 |
| WO | 0140995 A1 | 6/2001 |

OTHER PUBLICATIONS

Final Office Action for U.S. Appl. No. 13/217,403, mailed Nov. 30, 2012, 16 pages, U.S. Patent and Trademark Office.

Non-Final Office Action for U.S. Appl. No. 13/217,403, mailed Oct. 31, 2013, 16 pages, U.S. Patent and Trademark Office.

Final Office Action for U.S. Appl. No. 13/217,403, mailed May 28, 2014, 20 pages, U.S. Patent and Trademark Office.

Advisory Action for U.S. Appl. No. 13/217,403, mailed Sep. 24, 2014, 9 pages, U.S. Patent and Trademark Office.

Notice of Allowance for U.S. Appl. No. 13/217,403, mailed Nov. 28, 2014, 9 pages, U.S. Patent and Trademark Office.

| Font | Foundry | Family | Language | Character Map |
|---|---|---|---|---|
| Times new roman | Monotype Co. | Times | 1. Latin<br>2. Greek<br>3. Coptic<br>4. Cyrillic<br>5. Hebrew | (U+0020,U+01FF)<br>........<br>(U+02C6,U+02C9)<br>..........<br>(U+FB20,U+FB4F) |
| Song typeface | ZhongYi Co. | Song typeface | Simple Chinese | (U+0020,U+00FC)<br>.......<br>(U+4D13,U+4D19)<br>.......<br>(U+4E00,U+9FA5)<br>....... |
| Founder-Song typeface | Founder | Founder-Song typeface | Simple Chinese | (U+0020,U+00FC)<br>.......<br>(U+4D13,U+4D19)<br>.......<br>(U+4E00,U+9FA5)<br>....... |
| Founder Extended | Founder | Founder Extended | Simple Chinese | (U+0020,U+00FC)<br>.......<br>(U+3D07,U+4DB5)<br>....<br>(U+4E00,U+9FA5)<br>.......<br>(U+20000,U+2A6D6) |
| Tahoma | Microsoft Co. | Tahoma | 1. Latin<br>2.Greek<br>3.Coptic<br>4.Cyrillic<br>5.Hebrew<br>6.Arabic<br>7.Thai | (U+0020,U+007E)<br>(U+00A0,U+00FF)<br>.......<br>(U+0400,U+04E9)<br>(U+05B0,U+05F4)<br>(U+060C,U+06FE) |

FIG. 5

QUICK FONT MATCH

CROSS-REFERENCE TO RELATED APPLICATIONS

The present application is a continuation of U.S. patent application Ser. No. 13/217,403 filed Aug. 25, 2011.

BACKGROUND

Embodiments of the present invention relate to a font matching technology, and in particular relates to a technology for determining a suitable font using a series of attribute/value pairs of the font.

With the rapid development of text processing technology and substantive development of text processing software (program), computers may display and process more and more font types and support text processing under more and more languages. Examples of these font types include: Times New Roman, Arial, Tahoma, Song typeface, etc. Each font can only support limited kinds of languages and characters within a particular Unicode encoding range. Thus, for a multilingual text, it may be necessary to display with multiple fonts. If text processing software cannot exactly match a suitable font, the multi-lingual text cannot be displayed correctly. FIG. 1A shows an example of the above problem. In the text opened with a "notebook" program as shown in FIG. 1A, there are texts in multiple languages (including Chinese, Japanese, Korean, etc.). While in this "notepad," only Chinese text can be normally displayed, and the texts in other languages cannot be displayed correctly. Accordingly, the "notepad" program fails to correctly match suitable fonts to display texts in different languages. FIG. 1B shows the content correctly displayed in the "notepad" document.

Of course, a user may manually select a font for each text. For example, in the case of the garbled codes as shown in FIGS. 1A and 1B, it may be difficult for the user to determine which font can correctly display the current text, which seriously affects user experience. Besides, for text processing software that does not support manual font selection, the above font match function cannot be implemented.

BRIEF SUMMARY

In view of the above problems, one embodiment of the present invention provides a system and method for quickly and accurately performing font matching. Another embodiment of the present invention provides a system and method for font matching, which is independent from text processing software and may be called by any text processing software (application). A further embodiment of the present invention provides a system and method for font matching with match conditions which are flexibly configurable by a user. An idea of the present invention is mainly based on the following consideration: since there are a plurality of font attributes that may be used for identifying a font, for example, the Unicode encoding range for characters supported by the font, languages supported by the font, font family to which the font belongs, and foundry of the font, etc., font matching is automatically, quickly and accurately implemented with different attribute values of each kind of font by the technology introduced from information retrieval.

According to an aspect of the present invention, there is provided a method for font matching, comprising: generating a two-dimensional link matrix based on available fonts and attribute values of the available fonts; receiving a font match query; and determining a font matching the received font match query from the available fonts by using the two-dimensional link matrix.

According to an embodiment of the present invention, in the two-dimensional link matrix, the two dimensions are an attribute of the font and a name of the font, respectively, and each row in the two-dimensional link matrix indicates an attribute value of each font attribute corresponding to a font.

According to another aspect of the present invention, there is provided a system for font matching, comprising: matrix generating means for generating a two-dimensional link matrix based on available fonts and attribute values of the available fonts; receiving means for receiving a font match query; and font match determining means for determining a font matching the received font match query from the available fonts by using the two-dimensional link matrix.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 5 shows a two-dimensional link matrix for a process of font matching according to an embodiment of the present invention.

DETAILED DESCRIPTION

Figures 1A, 1B:
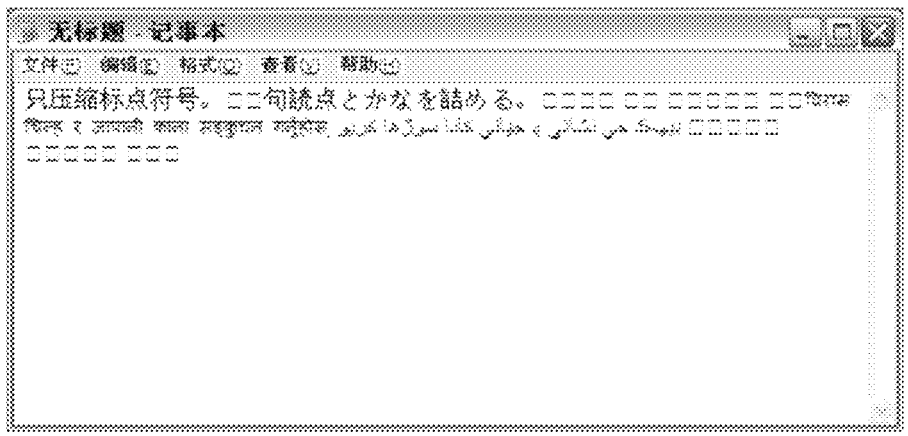
FIG. 1A shows a scenario of incorrect text display due to failure of font match in a "notepad" document.
FIG. 1B shows a correct text content in the "notepad" document as shown in FIG. 1A.
Figure 2:
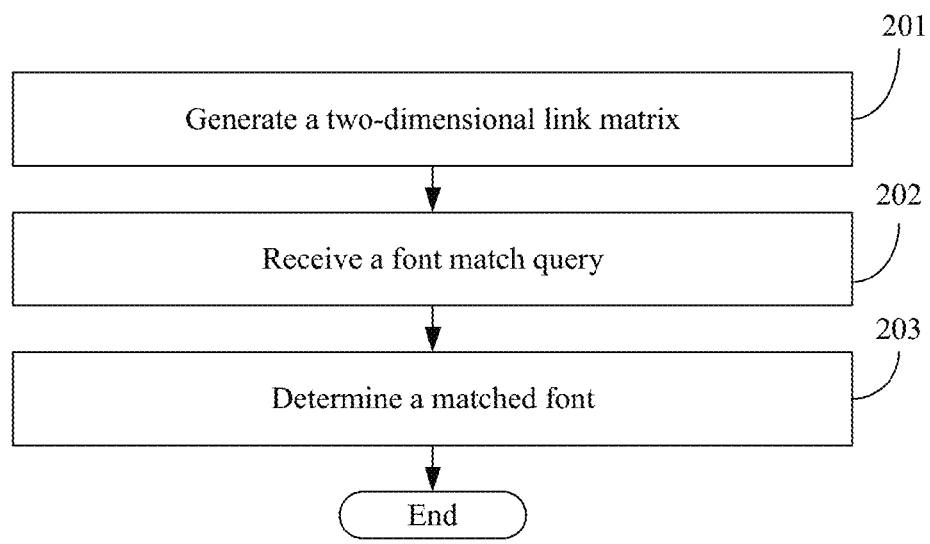
FIG. 2 shows a flow chart of a method of font matching according to an embodiment of the present invention.

FIG. 2 shows a flow chart of a method of font matching according to an embodiment of the present invention. The method as shown in FIG. 2 starts from step 201, where a two-dimensional link matrix is generated. The two-dimensional link matrix is generated based on currently available fonts and attribute values of the available fonts. According to an embodiment of the present invention, "currently available fonts" refer to the fonts having been installed in or supported by a system. For example, in a computer, it is possible that only the font Times New Roman is installed, then all other fonts, for example "Song typeface" for displaying Chinese, do not belong to currently available fonts. "Attribute values of font" refers to values of each font with respect to different font attributes. For example, attributes of a font may comprise Unicode encoding range, supported languages, the font family it belongs to, foundry, etc. Each font may have different attribute values for each of the above font attributes, and differences between these attribute values are used in embodiments of the present invention to distinguish different fonts. For example, the font family to which the font Times New Roman belongs is "Times," while the font family to which the font "Founder extended" belongs is "Founder extended," while the font family to which the font "Tahoma" belongs is "Tahoma." With "Foundry" as a further example, the "Foundry" attribute value of the font "Song Typeface" is "ZhongYi Co.," while the "Foundry" attribute value of the font "Times New Roman" is "Monotype Co.".

Figure 4:
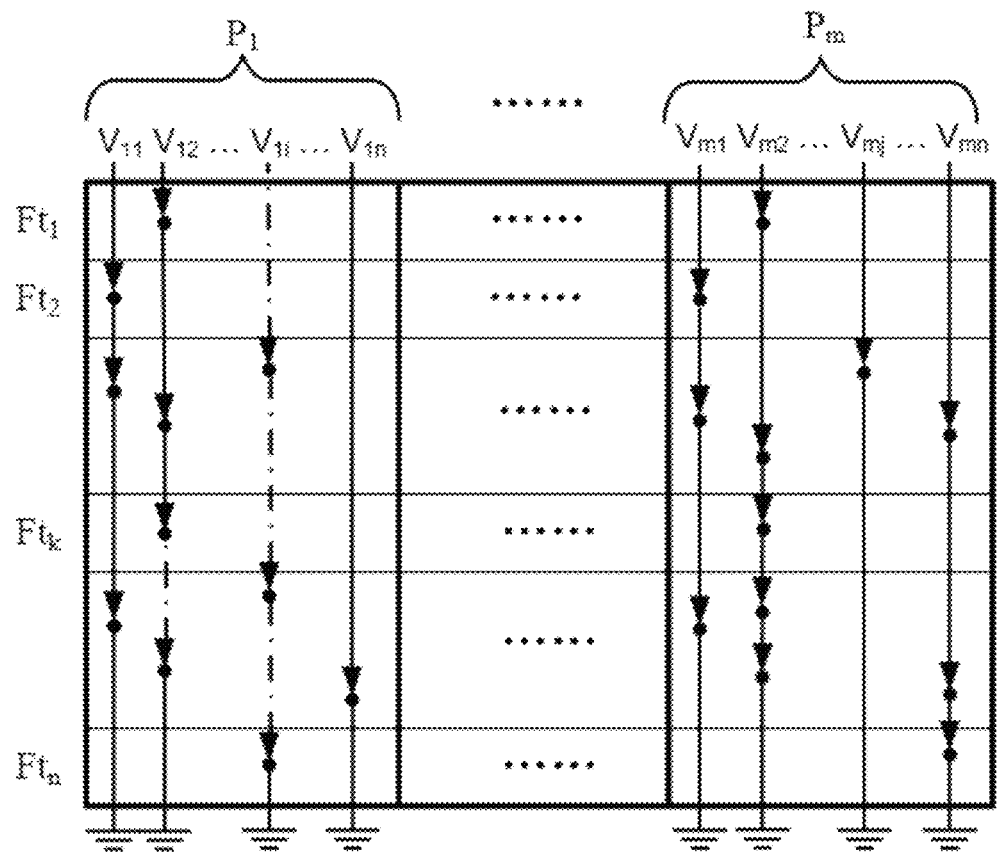
FIG. 4 shows a diagram of a two-dimensional link matrix according to an embodiment of the present invention.

At step 201, a two-dimensional link matrix recording the above information is generated by the information about the currently available fonts and the information about their attribute values. According to an embodiment of the present invention, each row of the two-dimensional link matrix indicates an attribute value of each font attribute corresponding to a font instance. FIG. 4 shows a diagram of a two-dimensional link matrix generated at step 201. In FIG. 4, Pm indicates the $m^{th}$ font attribute, $Ft_n$ indicates the nth currently available font, and $V_{mn}$ indicates an attribute value of the $m^{th}$ font attribute of the nth currently available font. Vertical lines with arrows and dots as shown in FIG. 4 show that some fonts have same attribute values with respect to a certain attribute. It may be understood that each row in the two-dimensional link matrix as shown in FIG. 4 indicates a font which may be expressed by the following vector: $Ft=(V_{p1}, V_{p2}, \ldots, Vpm)$, wherein Ft indicates a font instance, and $V_{p1}$-$V_{pm}$ indicate attribute values of the font corresponding to attributes $P_1$-$P_m$. The skilled in the art should understand that FIG. 4 only shows an expression of a two-dimensional link matrix, and no matter which data structure or table structure is used to record the information about available fonts and information about their attribute values in a computer system, they all fall within the protection scope of the embodiments of this invention. It should be further noted that "two-dimensional link matrix" does not mean any limitation to the manner of recording information about fonts and information about font attribute values, or mean that the matrix format as shown in FIG. 4 or any other particular information storage format must be used.

It should be noted that the information about currently available fonts and information about attribute values as used in the process of generating a two-dimensional link matrix at step 201, according to an embodiment of the present invention, may be obtained from an installed font configuration file or pre-inputted by a developer. As to which font attributes are selected to construct a two-dimensional link matrix, it may be flexibly adjusted. The skilled in the art should understand that not all obtained font attributes must be stored into the two-dimensional link matrix, but that some representative attributes or some that have a relatively strong function for identifying font type may be selected.

Next, at step 202, a font match query is received. According to an embodiment of the present invention, a font match query comprises at least one attribute-attribute value pair. According to an embodiment of the present invention, a font match query has the following form: $Q=\{P_{q1}=V_{q1}, P_{q2}=V_{q2}, \ldots, P_{qk}=V_{qk}\}$, wherein Q indicates a font match query, $P_{qk}$ indicates the $k^{th}$ attribute in the query Q for font match, $V_{qk}$ indicates the attribute value of the $k^{th}$ attribute in the query Q for font match. The skilled in the art should note that the form of the above font match query only exemplarily illustrates the content of the font match query, which does not mean any limitation to its expression manner. As to the source and generation manner of a font match query, according to an embodiment of the present invention, the font match query may come from any arbitrary third-party text processing program (software). For example, when a user uses a text processing program such as "notepad" or "Word" to open a document, this text processing program may obtain a font attribute and its attribute value by analyzing the character Unicode encoding as contained in the document. As to which attribute values of font attributes are to be obtained by the third-party text processing program, it may be flexibly configured by a program developer. For example, when a document is opened by a "Word" program, theoretically, the "Word" program per se may obtain many font attribute values (for example thirty) of the font in the document, but not all these attributes and attribute values are helpful for font matching, thus a program developer may set that a font match query as generated by the "Word" program only comprises five attribute-attribute value pairs among thirty attribute-attribute value pairs. According to another embodiment of the present invention, a font match query may be directly set and inputted manually. For example, when a user knows the language type (for example Chinese) of the text to be displayed, he/she may input a piece of font match query Q={Language=Chinese}.

Next, the process proceeds to step 203. At step 203, a font matching the received font match query is determined from the available fonts based on the two-dimensional link matrix. Since information about font attribute-attribute value information of available fonts is stored in the two-dimensional link matrix generated at step 201, based on the information about attribute-attribute value information as contained in the font match query as received at step 202, a font matching the received font match query may be determined from available fonts. It should be noted that the font matching the received font match query may a particular font or a plurality of available fonts. In a situation where the matched font comprises a plurality of available fonts, according to an embodiment of the present invention, the font to be selected may be finally determined by the user.

It should be further noted that, step 201 in the method of FIG. 2 may be understood as generating a two-dimensional link matrix in a non-real time running state, and with constant increase of available font types (for example installing new fonts), the generated two-dimensional link matrix is constantly updated.

From the above content, it is seen that with the method for font match as shown in FIG. 2, font match may be implemented automatically, quickly, and accurately by using different attribute values of each font, without the need of manually randomly trying each font of a plurality of available fonts. Meanwhile, this method is independent from a text processing software (application) and may be called by any arbitrary text processing software. Moreover, this method allows the user to flexibly configure selection of the font attributes so as to perform font match more effectively.

Figure 3:
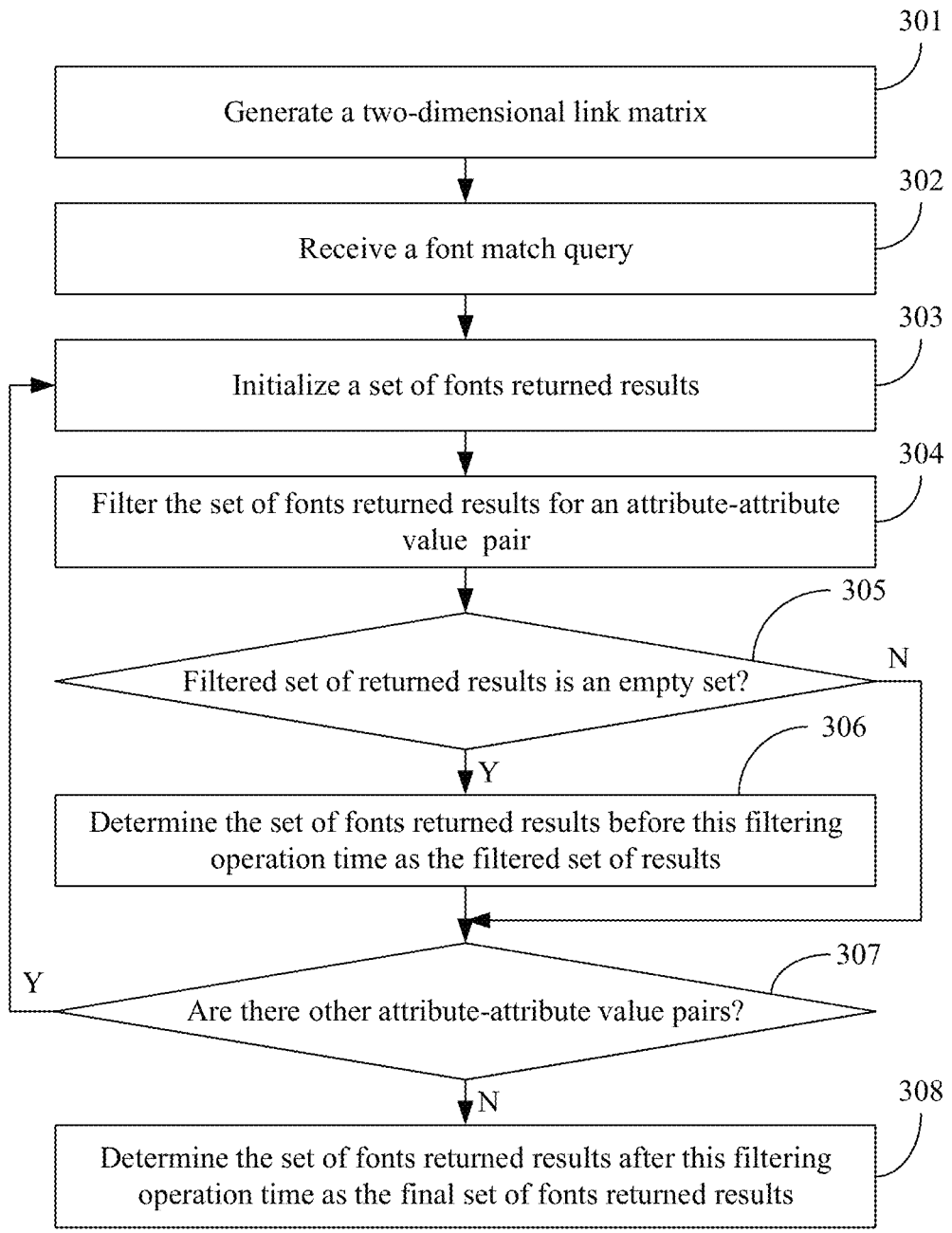
FIG. 3 shows a flow chart of a method of font matching according to another embodiment of the present invention.

FIG. 3 shows a flow chart of a method of font matching according to another embodiment of the present invention. It may be understood that steps 301 and 302 in the method as shown in FIG. 3 correspond to steps 201 and 202 as shown in FIG. 2, which will not be detailed here. Further, steps 303 to 308 in FIG. 3 may be understood as corresponding to step 203 in FIG. 2. In step 303, a set of fonts returned results is initialized. According to an embodiment of the present invention, a set of fonts returned results may be initialized as a set of fonts returned results containing all currently available fonts. The skilled in the art should understand that the initialization operation at step 303 is not a must, and it is totally allowed to directly perform the operation of step 304 to generate a set of fonts returned results for an attribute-attribute value pair without initializing the set of fonts returned results.

Next, the process proceeds to step 304. At step 304, the two-dimensional link matrix generated at step 301 is retrieved for an attribute-attribute value pair in the font match query as received at step 302, so as to filter the set of fonts returned results as initialized at step 303 (if without the operation of initialization at step 303, then step 304 is: retrieving the two-dimensional link matrix generated at step 301 for an attribute-attribute pair in the received font match query at step 302, to generate a set of fonts returned results). Since the font match query may comprise a plurality of attribute-attribute pairs, at step 304, the initialized set of fonts returned results is filtered with respect to an attribute-attribute value pair (in the case of initialization), i.e., filtering the first set of fonts returned results by a further limiting condition (a new attribute-attribute value pair), to derive a new set of fonts returned results.

Next, in step 305, whether the set of fonts returned results as filtered through step 304 is an empty set is determined. If not, then the process directly proceeds to step 307. If so, then the process directly proceeds to step 306.

At step 306, according to an embodiment of the present invention, the set of fonts returned results of immediately previously filtering is determined as a set of results after filtering of this time. If the final font return result is an empty set, there will be no font to be selected for displaying or inputting a text to which a font match query is directed, and therefore user experience might be affected. Therefore, once the final return result is determined as an empty set, the font return result of immediately previously filtering is provided to the user for selection. According to another embodiment of the present invention, if the determination result at step 305 is yes, then error information is provided: no font is found (not shown in FIG. 3). According to a further embodiment of the present invention, if the determining result in step 305 is yes, and then based on predetermined weights or priorities for each attribute, attribute-attribute value pair matches to be abandoned are selected such that the return result is not an empty set. Accordingly, the content in step 306 as shown in FIG. 3 is only an embodiment according to the present invention, and there are a plurality of possible embodiments to implement after determination of yes at step 305. It should be further noted that since step 303 of initializing the set of fonts returned results is not a must, without the initializing step, if the set of fonts returned results generated for a first attribute-attribute value pair is an empty set, then the operation to be performed at step 306 should be: determining a set composed of currently available fonts to be the set of fonts returned results after filtering of this time.

The method as shown in FIG. 3 determines whether the font match query further comprises other unmatched attribute-attribute value pairs in step 307. In order to guarantee the match accurateness, it is necessary to guarantee that all attribute-attribute value pairs in the font match query have been processed. If the determining result in step 307 is yes, then the process returns to step 304, and further the operations of steps 304 to 307 are performed again, until in step 307, the result is determined as no, which means all attribute-attribute value pairs in the font match query have been traversed (through match processing), to thereby proceed to step 308.

At step 308, the set of fonts returned results after filtering of this time is determined as the final set of fonts returned results, the font as contained in the final set of fonts returned results being the font matching the font match query as received. According to an embodiment of the present invention, the final set of fonts returned results comprises a font. According to another embodiment of the present invention, the final set of fonts returned results comprises a plurality of fonts. According to an embodiment of the present invention, in a situation where the final set of fonts returned results comprises a plurality of fonts, a plurality of fonts are provided to the user in a list form for the user to select a particular font therefore. According to an embodiment of the present invention, in a situation where the final set of fonts returned results only contains one font, this font is directly employed to display or input a text.

Further, it should be further noted that different weights may be set for attribute-attribute pairs in the font match query, such that the processing sequence of attribute-attribute pairs is arranged in the font match process according to the set weights.

FIG. 5 shows a two-dimensional link matrix for a process of font match according to an embodiment of the present invention. Hereinafter, a specific example of font match according to the present invention will be explained with reference to FIG. 5. Suppose there are 5 currently available fonts, "Times New Roman," "Song Typeface," "Founder—Song Typeface," "Founder Extended" and "Tahoma," respectively, and four attributes are selected to generate a two-dimensional link matrix as shown in FIG. 5: Foundry, Family, Language, and character encoding range (Character Map).

Suppose also that the first piece of font match query as received is as follows:

Query 1: {Character=0x036A, Language=Greek, Foundry=Microsoft}, this font match query comprises three attribute-attribute value pairs. As to this piece of font match query, firstly, the set of fonts returned results is initialized to be a set of currently available fonts={Times New Roman, Song typeface, Founder-Song typeface, Founder Extended, Tahoma}. Then, according to the first attribute-attribute value pair Character=0x036A in the font match query, the retrieval of two-dimensional link matrix as shown in FIG. 5 finds that the attribute value ranges of attribute "Character Map" of all the five available fonts contain 0x036A, thus the set of fonts returned that is generated after this attribute-attribute value pair match processing is the same as the set of fonts returned after initializing.

Next, the second attribute-attribute value pair Language=Greek in the font match query is processed, and retrieval of the two-dimensional link matrix as shown in FIG. 5 finds that only the attribute values of the attribute "language" of the two fonts "Times New Roman" and "Tahoma" contain Greek, thus the set of fonts returned as generated above is filtered, and the set of fonts returned after filtering is $S_{returned}$={Times New Roman, Tahoma}.

Next, the third attribute-attribute value pair Foundry=Microsoft in the font match query is processed, and retrieval of the two-dimensional link matrix as shown in FIG. 5 finds that only the attribute value of the attribute "Foundry" of the font "Tahoma" contain "Microsoft", thus the set of fonts returned as filtered above is filtered again to obtain the new set of fonts returned $S_{returned}$={Tahoma}.

Until now, the font match process for the first piece of font match query ends.

Suppose the second piece of font match query as received is as follows:

Query 2: {Character=0x20001, Family=Song Typeface}, which includes two attribute-attribute value pairs. Firstly, the set of fonts returned results is initialized to be a set of currently available fonts={Times New Roman, Song typeface, Founder-Song typeface, Founder Extended, Tahoma}. Then, according to the first attribute-attribute value pair Character=0x20001 in the font match query, retrieval of the two-dimensional link matrix as shown in FIG. 5 finds that only the attribute value range of attribute "Character Map" of the font "Founder Extended" contains 0x20001, thus the set of fonts returned that is generated after this attribute-attribute value pair match processing is $S_{returned}$={Founder Extended}.

Next, the second attribute-attribute pair value Family=Song typeface in the font match query is processed, and retrieval of the two-dimensional link matrix as shown in FIG. 5 finds that only the attribute value of the attribute "Family" of the font "Song typeface" is "Song typeface," while the font "Song typeface" is not included in the set of fonts returned results as generated above, thus after the set of fonts returned as above generated is filtered, the set of font result after filtering is $S_{returned}$=NULL (empty set). In this situation, the priority of the attribute "Character" in the font match query is higher than the priority of the attribute "Family" (or has a greater weight), then, the finally generated set of fonts returned is $S_{returned}$={Founder Extended}.

Figure 6:
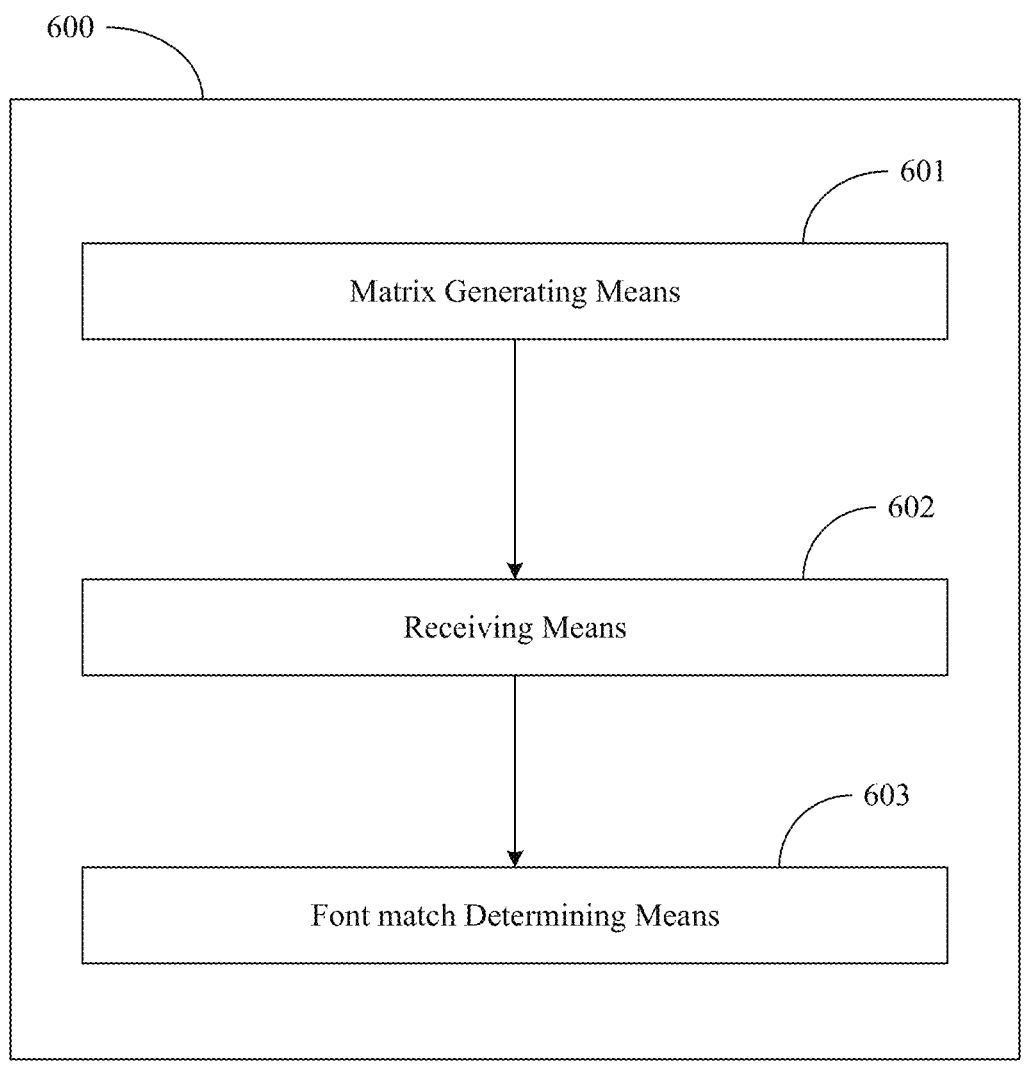
FIG. 6 shows a structural diagram of a system of font matching according to an embodiment of the present invention.

FIG. 6 shows a structural diagram of a system for font matching according to an embodiment of the present invention. The system shown in FIG. 6 is generally indicated by 600. Specifically, the system 600 comprises matrix generating means 601 for generating a two-dimensional link matrix based on available fonts and attribute values of available fonts; receiving means 602 for receiving a font match query; and font match determining means for determining a font matching the received font match query from the available fonts by using the two-dimensional link matrix. It may be understood that means 601-603 in the system 600 as shown in FIG. 6 correspond to steps 201-203 in the method as shown in FIG. 2, respectively.

Through the above description on preferred embodiments, the skilled in the art may understand that the above system, apparatus and method may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatus, server and their components in the present embodiment may be implemented by hardware circuitry of a semiconductor such as a very large scale integrated circuit or gate array, such as logical chip or transistor, or a programmable hardware device such as a field-programmable gate array, or a programmable logical device, or implemented by software executed by various kinds of processors, or implemented by combination of the above hardware circuitry and software.

Though the system and method for font match has been described in detail with reference to preferred embodiments, the present invention is not limited to this. A person of normal skill in the art can make various changes, alterations and modifications to the embodiments under the teaching of the description without departing from the spirit and scope of the present invention. It should be understood that all such changes, alterations, and modifications still fall into the protection scope of the present invention. The protection scope of the present invention is defined by the appending claims.

We claim:

1. A non-transitory computer readable storage medium comprising a set of instructions which, when executed by an apparatus, cause the apparatus to:
generate a two-dimensional link matrix to link a plurality of available fonts for displaying text each identified in the matrix with one or more font attributes identified in the matrix via one or more attribute values identified in the matrix;
receive a font match query to determine a suitable font for text to be displayed from the plurality of available fonts including one or more specified attribute-attribute value pairs; and
determine one or more fonts satisfying the received font match query from the available fonts based on a match between the one or more specified attribute-attribute value pairs and the one or more attribute values of the two-dimensional link matrix to determine which font can correctly display the text wherein determining the one or more fonts satisfying the received font match query further comprises retrieving the two-dimensional link matrix for one or more of the attribute-attribute value pairs in the font match query to generate a set of fonts returned results, wherein the set of fonts returned results includes a list of fonts that can correctly display the text corresponding to the font match query.

2. The computer readable storage medium according to claim 1, wherein each row in the two-dimensional link matrix indicates the attribute value of one different font instance corresponding to each of the font attributes.

3. The computer readable storage medium according to claim 2, wherein each of the one different font instance is indicated by the following vector: $Ft=(V_{p1}, V_{p2}, \ldots, V_{pm})$, wherein Ft indicates the one font instance, and $V_{p1}, V_{p2}, \ldots, V_{pm}$ indicate the attribute values of the one font instance corresponding to the font attributes indicated by $P_1, P_2, \ldots, P_m$.

4. The computer readable storage medium according to claim 1, wherein the font match query has the following form:

$$Q=\{P_{q1}=V_{q1}, P_{q2}=V_{q2}, \ldots, P_{qk}=V_{qk}\},$$

wherein Q indicates the font match query, $P_{qk}$ indicates the $k^{th}$ attribute in the query Q for font match, and $V_{qk}$ indicates the attribute value of the $k^{th}$ attribute in the query Q for font match.

5. The computer readable storage medium according to claim 1, wherein determining the one or more fonts satisfying the received font match query further comprises:
retrieving the two-dimensional link matrix for other attribute-attribute value pairs in the font match query one by one to filter the generated set of fonts returned results; and
determining a font contained in the set of fonts returned results after final filtering as the font matching the received font match query if all of the attribute-attribute value pairs in the font match query have been traversed.

6. The computer readable storage medium according to claim 5, wherein determining the one or more fonts satisfying the received font match query further comprises:
determining the set of fonts returned results previous to the filtering for use if the filtered set of fonts returned results is an empty set.

7. The computer readable storage medium according to claim 1, wherein determining the one or more fonts satisfying the received font match query further comprises:
initializing a set of fonts returned results to a set containing all available fonts before a first time of retrieving of the two-dimensional link matrix to generate the set of fonts returned results.

8. The computer readable storage medium according to claim 1, wherein determining the one or more fonts satisfying the received font match query further comprises:
determining the set of font returned results based on a predetermined weight value of each attribute, wherein a font that is filtered is selected to remain based on the predetermined weight value to prevent an empty set.

9. The computer readable storage medium according to claim 1, wherein the font match query is generated by a text processing application.

10. The computer readable storage medium according to claim 1 wherein the text to be displayed is from a document having multiple languages therein.

11. A system for determining a suitable font for displaying text, comprising:
   at least one processor coupled to at least one memory;
   a matrix generator to generate a two-dimensional link matrix to link a plurality of available fonts for displaying text each identified in the matrix with one or more font attributes identified in the matrix via one or more attribute values identified in the matrix;
   a receiver to receive a font match query to determine a suitable font for text to be displayed from the plurality of available fonts including one or more specified attribute-attribute value pairs; and
   a font matcher to determine a font satisfying the received font match query from the available fonts based on a match between the one or more specified attribute-attribute value pairs and the one or more attribute values of the two-dimensional link matrix to determine which font can correctly display the text wherein the font matcher is further configured to retrieve the two-dimensional link matrix for one or more of the attribute-attribute value pairs in the font match query to generate a set of fonts returned results.

12. The system according to claim 11, wherein each row in the two-dimensional link matrix indicates the attribute value of one different font instance corresponding to each of the font attributes.

13. The system according to claim 12, wherein each of the one different font instance is indicated by the following vector: $Ft=(V_{p1}, V_{p2}, \ldots, V_{pm})$, wherein Ft indicates the one font instance, and $V_{p1}, V_{p2}, \ldots, V_{pm}$ indicate the attribute values of the font corresponding to the font attributes indicated by $P_1, P_2, \ldots, P_m$.

14. The system according to claim 12, wherein the font matcher is further configured to:
   determine a sequence of retrieving the two-dimensional link matrix for the attribute-attribute value pairs in the font match query based on a predetermined weight value of each attribute.

15. The system according to claim 11, wherein the font match query has the following form:

$$Q=\{P_{q1}=V_{q1}, P_{q2}=V_{q2}, \ldots, P_{qk}=V_{qk}\},$$

wherein Q indicates the font match query, $P_{qk}$ indicates the $k^{th}$ attribute in the query Q for font match, and $V_{qk}$ indicates the attribute value of the $k^{th}$ attribute in the query Q for font match.

16. The system according to claim 11, wherein the font matcher is further configured to:
   retrieve the two-dimensional link matrix for other attribute-attribute value pairs in the font match query one by one to filter the generated set of fonts returned results; and
   determine a font contained in the set of fonts returned results after final filtering as the font satisfying the received font match query if all of the attribute-attribute value pairs in the font match query have been traversed.

17. The system according to claim 16, wherein the font matcher is further configured to:
   determine the set of fonts returned results previous to the filtering operation for use if the filtered set of fonts returned results is an empty set.

18. The system according to claim 11, wherein the font matcher is further configured to:
   initialize a set of fonts returned results to a set containing all available fonts that can correctly display the text before a first time of retrieving of the two-dimensional link matrix to generate the set of fonts returned results.

19. The system according to claim 11, wherein the font match query is generated by a text processing application.

20. The system according to claim 11 wherein the text to be displayed is from a document having multiple languages therein.

* * * * *